(12) United States Patent
Rouwhorst

(10) Patent No.: US 6,938,966 B1
(45) Date of Patent: Sep. 6, 2005

(54) CABINET CONNECTOR

(76) Inventor: Kevin Rouwhorst, 4326-134th Ave., Hamilton, MI (US) 49419

( * ) Notice: Subject to any disclaimer, the term of this patent is extended or adjusted under 35 U.S.C. 154(b) by 0 days.

(21) Appl. No.: 10/799,136

(22) Filed: Mar. 12, 2004

(51) Int. Cl.⁷ ............................................. F16B 12/00
(52) U.S. Cl. .................................................. 312/111
(58) Field of Search ........................ 312/111, 107, 108, 312/257.1, 263, 198, 140; 403/409.1, DIG. 11

(56) References Cited

U.S. PATENT DOCUMENTS

| | | | |
|---|---|---|---|
| 2,240,268 A | * | 4/1941 | Ruddy .......................... 164/235 |
| 2,482,174 A | * | 9/1949 | Hake ............................ 312/111 |
| 2,582,553 A | * | 1/1952 | McMurtrie ................... 446/121 |
| 3,000,680 A | | 9/1961 | Zelenko |
| 3,059,983 A | | 10/1962 | Strom |
| 3,554,387 A | * | 1/1971 | DeNatale .................... 211/194 |
| 3,996,718 A | | 12/1976 | Welch |
| 4,037,978 A | * | 7/1977 | Connelly .................... 403/164 |
| 4,127,353 A | * | 11/1978 | Busse ......................... 403/245 |
| 4,197,029 A | | 4/1980 | Barreau et al. |
| 4,353,663 A | * | 10/1982 | Glickman ................... 403/230 |
| 4,587,788 A | | 5/1986 | Bielicki |
| 4,641,988 A | | 2/1987 | Ganner |
| 4,786,119 A | | 11/1988 | Smuda |
| 4,797,021 A | * | 1/1989 | Stamper ...................... 403/165 |
| 4,826,263 A | * | 5/1989 | Speraw ....................... 312/111 |
| 4,844,565 A | * | 7/1989 | Brafford et al. ........... 312/107.5 |

FOREIGN PATENT DOCUMENTS

| FR | 2109202 | | 5/1972 | |
|---|---|---|---|---|
| GB | 183630 | * | 8/1922 | .................. 312/111 |

* cited by examiner

Primary Examiner—James O. Hansen
(74) Attorney, Agent, or Firm—Varnum Riddering (57) ABSTRACT

A connector for interconnecting vertical panels of adjacent cabinets comprises male and female connector elements releasably mounted in opposed openings in the sidewalls of adjoining cabinet modules. Each connector element comprises a body that is shaped to fit into a compatible opening in a sidewall of a cabinet. The body desirably has locking tabs extending radially outwardly therefrom. The locking tabs fit into the opening in the sidewall and then are rotated into locking slots in the sides of the openings. A projection with an enlarged head on the male connector element fits in a keyhole slot in the female connector element to lock the two connector elements together.

7 Claims, 6 Drawing Sheets

CABINET CONNECTOR

BACKGROUND OF THE INVENTION

The present invention comprises a cabinet connector for releasably connecting together individual modules of a suspended cabinet system that is suspended from a ceiling or wall.

Suspended cabinet systems are typically manufactured in modules and connected together side by side and mounted to a wall or ceiling. Usually, one module is mounted to the building structure and then the next module is held in place adjacent the first module while it is attached to the first module and attached to the wall or ceiling. This generally takes two or three people to do and is somewhat difficult. Releasable connectors are sometimes used to connect adjacent panels of cabinets, but the releasable connectors frequently are time consuming to install and involve more work than simply bolting the two panels together.

An object of the present invention is to provide an easy to mount and easy to install connector for interconnecting adjacent vertical panels of cabinet sections. Another object of the invention is to provide a rigid connector that can support a substantial amount of weight. Prior releasable connectors have typically been flimsy and unable to support the weight of adjoining cabinets.

SUMMARY OF THE INVENTION

In accordance with the present invention, a connector for interconnecting vertical panels of adjacent cabinets comprises male and female connector elements releasably mounted in opposed openings in the sidewalls of adjoining cabinet modules. Each connector element comprises a body that is shaped to fit into a compatible opening in a sidewall of a cabinet. The body desirably has locking tabs extending radially outwardly therefrom. The locking tabs fit into the opening in the sidewall and then are rotated into locking slots in the sides of the openings. A projection with an enlarged head on the male connector element fits in a keyhole slot in the female connector element to lock the two connector elements together.

While connector elements that are inserted and rotated into locking engagement are preferred, connector elements can be attached with screws that extend through the sides of the connector elements.

These and other features, objects, and benefits of the invention will be recognized by one having ordinary skill in the art and by those who practice the invention, from the specification, the claims, and the drawing figures.

DETAILED DESCRIPTION OF THE INVENTION

Figure 1:
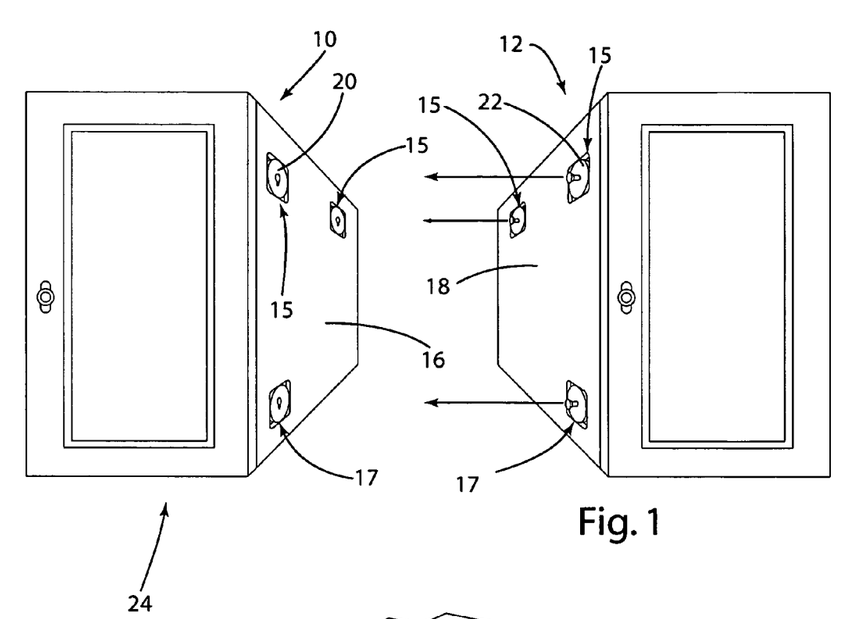
FIG. 1 is a pictorial view showing two cabinets in position to be interconnected with the releasable connectors of the present invention.

Referring to the drawings, a pair of cabinets 10 and 12 are shown in FIG. 1 in position to be joined together by means of a releasable connector mechanism 14 constructed in accordance with the present invention. Cabinets 10 and 12 typically are suspended cabinets that are attached to a wall or ceiling at an elevated position and connected together by abutting vertical sidewalls 16 and 18. In a typical installation, a first cabinet, for example cabinet 10, is mounted in position on a wall and fastened in a suspended position. The next cabinet, for example cabinet 12, is then mounted to the wall adjacent cabinet 10, with sidewalls 16 and 18 in abutment. It is difficult to mount cabinet 12 in exactly the right position with respect to cabinet 10 if the cabinets are not connected together. And it is difficult to connect the cabinets in exactly the right position. It is particularly difficult to connect the cabinets together with a connector that is sufficiently strong that the second cabinet 12 can effectively be hung in proper position by the connectors themselves until a single workman has an opportunity to drill appropriate holes and insert appropriate fasteners for connecting the second cabinet to the wall.

In the present invention, the connector mechanism includes a plurality of connectors (3 in this case), with each connector including a female connector element 20 and a corresponding male connector element 22. As shown in FIG. 1, it is desired that the connector system 14 includes two cabinet connectors 15 positioned at spaced locations at an upper portion on the cabinets and a lower connector 17 being positioned at a lower position on the cabinets, and preferably toward the front 24 of the cabinets.

As stated above, each connector includes a female connector element 20 and a male connector element 22 that releasably lock together.

Figure 2:
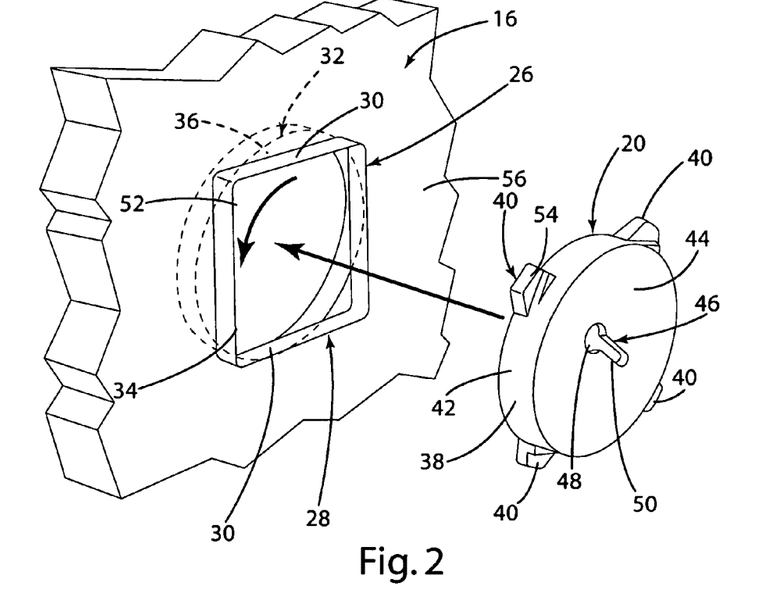
FIG. 2 is a fragmentary perspective view showing the manner in which one connector is mounted in a cabinet sidewall.

As shown in FIG. 2, connector element 20 fits in a special opening 26 formed in the sidewall of the cabinet. Opening 26 has a square outer portion 28 having edges 30 that are perpendicular to the plane of the sidewall. Edges 30 extend inwardly a predetermined distance. Inward of square opening 28 is a circular opening 32 having a diameter that is somewhat greater than the length of a side 34 of square 28. The diameter of the circle can be as large as the diagonal distance across the square or larger but typically is somewhat smaller than the diagonal distance across the square, as shown. With the circular portion 32 being formed as shown, a portion of the circle 36 extends outwardly past edge 30 and forms an arcuate lateral slot in edge 30.

Female connector element 20 comprises a cylindrical body 38 having outwardly extending tabs 40 spaced at regular intervals around the tubular sidewall 42 of the body. Tabs 40 are spaced away from an outer surface 44 that covers a front end of the body. Tabs 40 preferably are spaced away from front end 44 by a distance approximately equal to the thickness of square sidewalls 30. A keyhole slot 46 comprising an enlarged opening 48 at one end and a more narrow slot 50 at the other end is formed in front surface 44 of the body.

Figure 3:
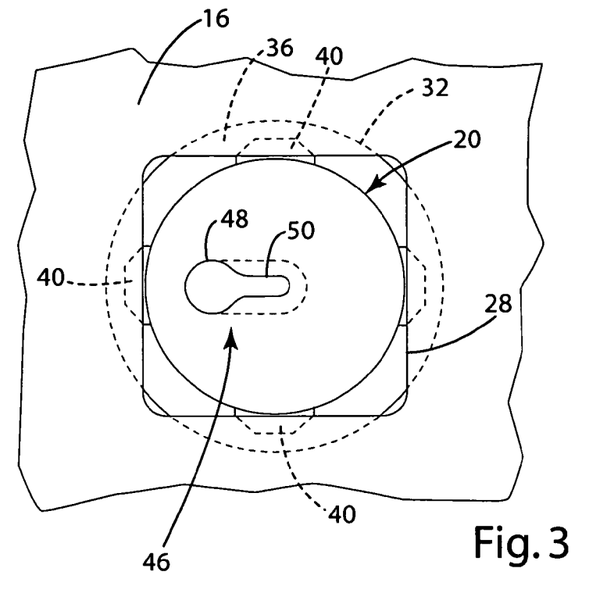
FIG. 3 is a front elevational view of a cabinet sidewall, showing the manner in which a connector is mounted in a recess in the cabinet sidewall.
Figures 4, 5:
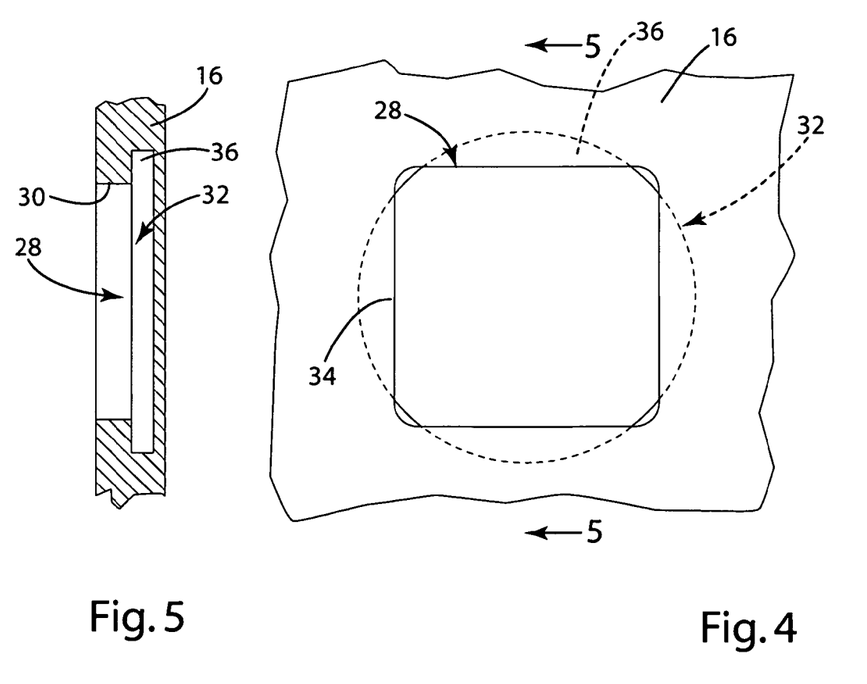
FIG. 4 is a front elevational view of the cabinet sidewall of FIG. 3, showing the opening therein.
FIG. 5 is a sectional view taken along lines 5—5 of FIG. 4.

Connector element 20 is inserted into cabinet sidewall opening 26 in the orientation shown in FIG. 2, with the tabs 40 being positioned opposite corners 52 of the square opening. Tabs 40 are shaped so that they fit into the openings and can slide inwardly through the square openings. Cylindrical body 38 desirably is shaped so that it just fits inside of interior walls 30 of the square portion of the opening 26, with the walls 30 of the opening constraining sideways movement of the connector element. The connector element thus fits into the opening 26 with the tabs at the diagonal corners of the square. The ends 54 of the tabs are flat and fit inside the circular opening 32 that lies immediately inward of the square opening. Thus, the tabs fit into the circular portion of the opening. When the connector element has been fully inserted in the opening, outer surface 44 is approximately flush with inner surface 56 of panel 16. The connector element is then rotated in a counter-clockwise direction, as shown in FIG. 2, until tabs 40 are positioned at the midpoints of the sidewalls of square 28, as shown in FIG. 3. In this position, the tabs are locked in slots 36 and provide relatively wide areas of contact with the sidewall slots that resist the withdrawal of the connector element from opening 26. Because there are four separate slots and four wide tabs at different angular positions, the connector element is securely locked in position in the sidewall of the cabinet and cannot be removed by normal outward pressure on the connector element.

Figure 10:
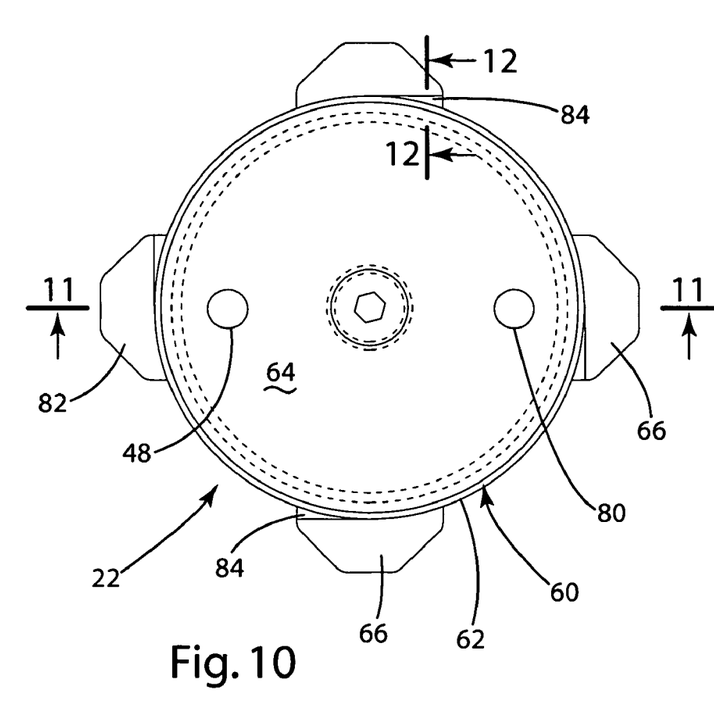
FIG. 10 is a plan view of the male connector element of the present invention.
Figure 11:
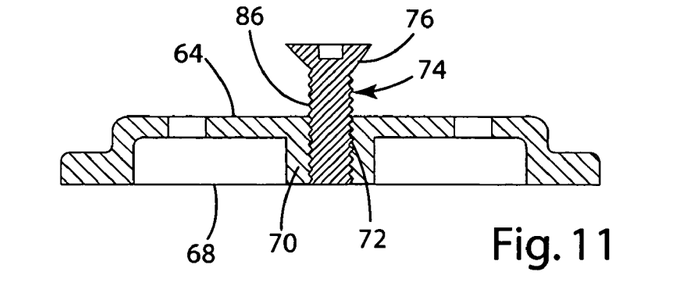
FIG. 11 is a sectional view taken along line 11—11 of FIG. 10.
Figure 12:
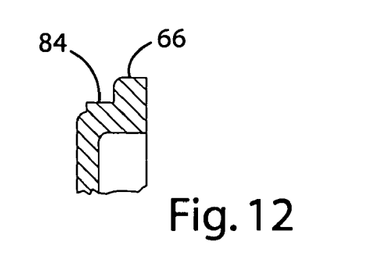
FIG. 12 is a sectional view taken along line 12—12 of FIG. 10.

The male connector element 22 is formed and mounted in a manner similar to the female connector element, as shown in FIGS. 10–12. Male connector element includes a cylindrical body 60 having sidewalls 62 and an outer surface 64. Four angularly spaced tabs 66 extend outwardly from the sidewalls at a position adjacent an inner side 68 of the connector element. A boss 70 is formed in the center of the connector element and has a threaded opening 72 therethrough. A screw 74 is threaded into opening 72, with the screw having a beveled head 76.

The outer surface 64 of the male connector element (as well as the female connector element) includes a pair of spaced openings 80 therethrough. These openings receive projections from a wrench-like tool that is inserted in the openings and rotated in order to angularly rotate the connector element into its locking position in the opening in the sidewall (the locking position being shown in FIG. 3).

Outer edges 82 of the tabs are rounded or beveled downwardly, so that the tabs cam under the edges of square opening 28 in moving between their released and locked positions.

As shown in FIG. 12 and FIG. 10, the body of the male (as well as the female) connector element includes a wedge-shaped portion 84 adjacent a trailing edge of at least two of the tabs. Wedge shaped portion 84 is formed on the cylindrical portion of the connector element between the tab and the outer surface 64. The wedge shaped portion 84 is rotated into a wedging engagement with square sidewall 30 as the connector element is rotated from the insertion position shown in FIG. 2 to the locked position shown in FIG. 3. This tends to wedge the connector element in place and lock it in the FIG. 3 position. The wedge can be shaped so that it is difficult to rotate the tabs past the vertical and horizontal positions shown in FIG. 3.

With the connector elements 20 and 22 being mounted in position, as shown in FIG. 1, it can be seen that the head 76 of screw 74 fits through enlarged opening 48 in the female connector element and then slides under the sides of narrow slot 50, with the head of the screw being larger than opening 48 but smaller than the distance across slot 50. The head of screw 74 thus fits through the enlarged opening and then fits behind the edges of slot 50 as the cabinets are slid into locking position. When the cabinets are slid into locking position, the cabinets are held in place by the three screws 74 locked in position in the keyhole slots in connector elements 20.

An advantage feature of the connector system of the present invention is that screw 74 is not merely a wood screw threaded into the side of a wood cabinet and sustained in position by the threads on the screw. Instead, the screw is mounted securely in the non-wood male connector element, so the screw is much less subject to being dislodged from the threaded opening. The connector element may be formed of metal or an appropriate synthetic resin. Further, the screw is not held in place in the wood sidewall by its own threads, but is held in place by the entire body of the connecting element 22, and this connection with the wood occurs over a substantial bearing surface provided by all four tabs of the connector element.

Figures 6, 7, 8, 9:
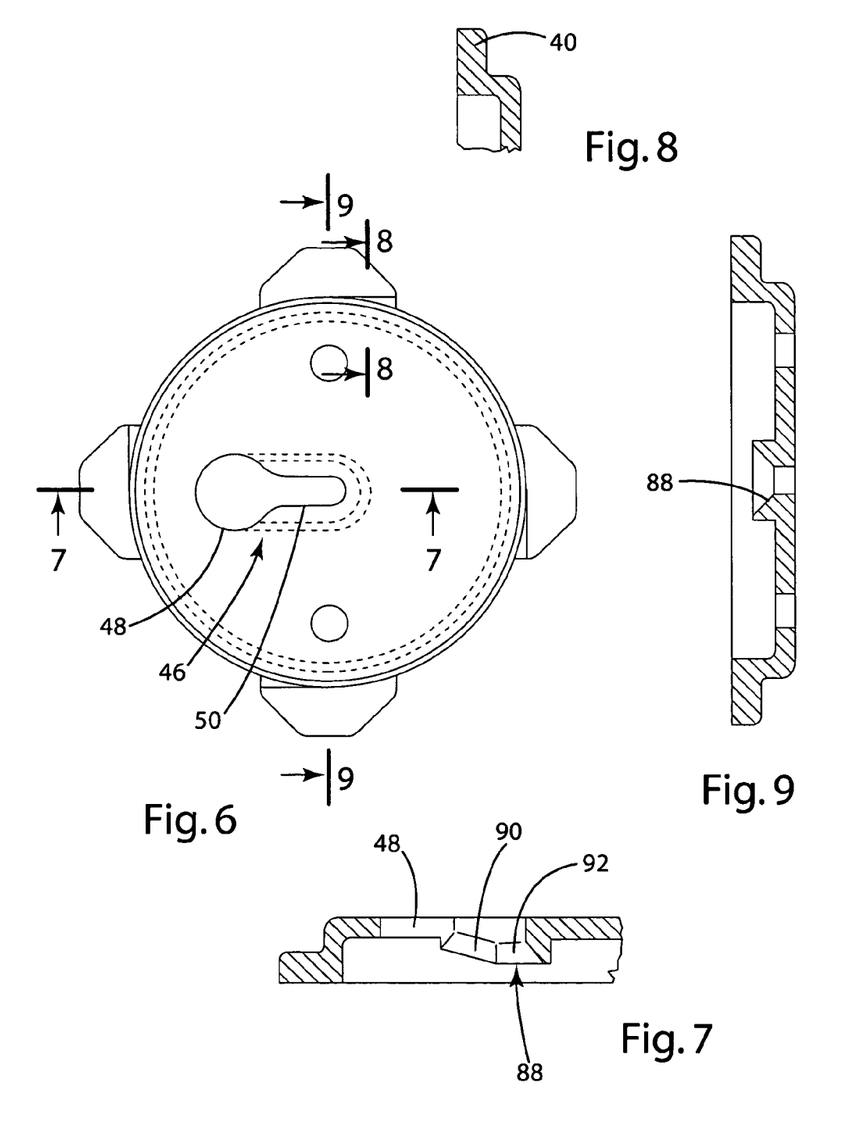
FIG. 6 is a plan view of the female connector of the present invention.
FIG. 7 is a sectional view taken along lines 7—7 of FIG. 6.
FIG. 8 is a sectional view taken along lines 8—8 of FIG. 6.
FIG. 9 is a sectional view taken along lines 9—9 of FIG. 6.

Additional details of the female connecting element 20 are shown in FIGS. 6–9. As shown in FIG. 9, an interior surface 88 of the side edges of the narrow portion 50 of keyhole slot 46 are beveled at the same angle as the head 76 of screw 74. Thus, the screw head is urged toward a centered position in the slot. In addition, beveled surface 88 has a downwardly inclined portion 90 that leads downwardly from enlarged opening 48 to a lower portion 92 at the distal end of narrow portion 50. The head of the screw thus is inserted in the slot through opening 48 and then is drawn inwardly as it engages inclined surface 90 and then is lodged securely at a lower portion 92 of the slot, where the screw is not biased to slide out of the slot.

With the construction of the present invention and employing three connectors in the manner shown in FIG. 1, a first cabinet 10 can be mounted in proper position. A second cabinet can then be clipped into position simply by fitting the connectors together and sliding the cabinet rearwardly into a locked position. The connectors are so strong that the second cabinet can simply be left hanging by the connector elements alone until the workman can secure the second cabinet to the wall or ceiling. This is a job that can be done by a single workman without requiring any help from any other people to hold the second cabinet up while it is attached to the first cabinet. Moreover, all of the openings can be prefabricated in the factory where the cabinets are made, so that the openings are accurately positioned and the cabinets can be accurately connected together very simply.

While the foregoing embodiment wherein a square opening is positioned over a circular opening is preferred, it is also possible to fabricate openings in the sidewalls of different shapes and still realize benefits from of the present invention.

Figure 13:
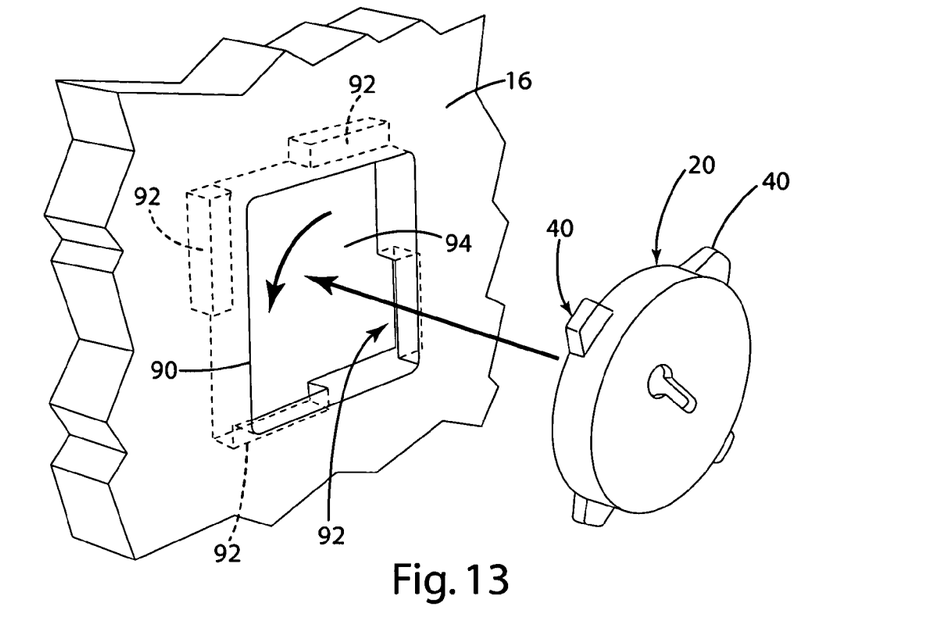
FIG. 13 is a fragmentary perspective view of a second embodiment of the present invention, showing a modified recess opening in the panel sidewall.

For instance, in FIG. 13 instead of making a circular slot behind the square slot, a square slot 90 is first formed and then four separate rectangular slots 92 are formed at the base or bottom of slot 90 adjacent surface 94 at the bottom of the slot. Tabs 40 on connector element 20 fit in the rectangular slots 92.

Figure 14:
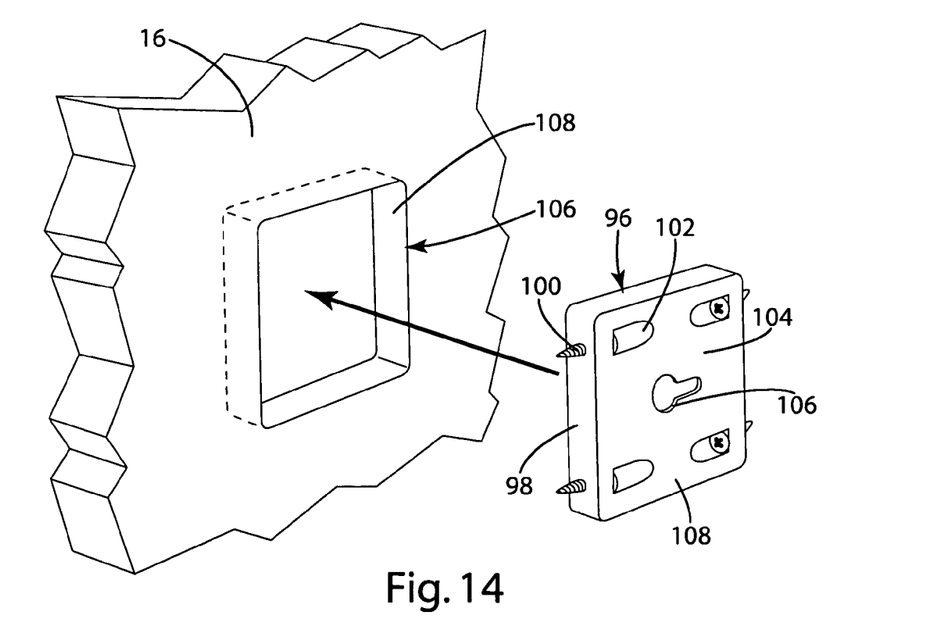
FIG. 14 is a fragmentary perspective view showing a second embodiment of the female connector of the present invention and corresponding opening in the panel sidewall.
Figure 15:
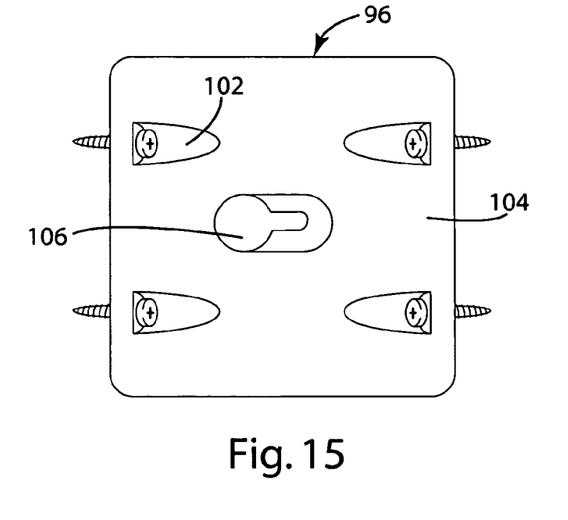
FIG. 15 is a front elevational view of the female connector of FIG. 14.
Figure 16:
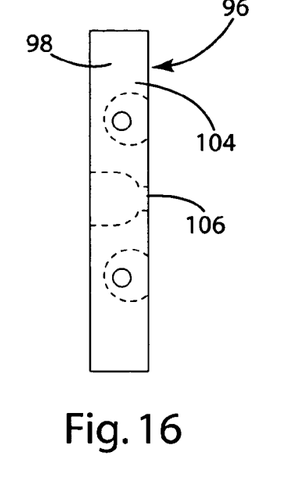
FIG. 16 is an edge view of the left side of the connector of FIG. 15.
Figure 17:
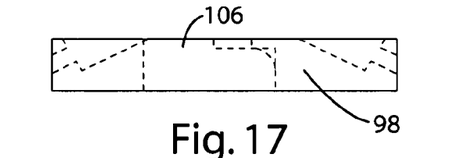
FIG. 17 is an edge view of the bottom edge of the connector of FIG. 15.

In FIG. 14, another embodiment of the present invention is shown in FIGS. 14–19. In this embodiment, female connector element 96 is rectangular and has rectangular sidewalls 98. Screws 100 extend through openings in the sidewalls through recessed openings 102 in the body 104 of the connector elements. To install the rectangular connector elements in a rectangular hole 106 in a cabinet sidewall of the same shape, the body 104 is first inserted in opening 106 and then screws 100 are inserted though openings 102 and threaded into interior sidewalls 108 of the rectangular opening 106. This provides a secure multi-point connection, but is somewhat more time consuming than the rotational locking method employed in locking the round connector elements in the holes, as shown in embodiment of FIG. 1.

Figure 18:
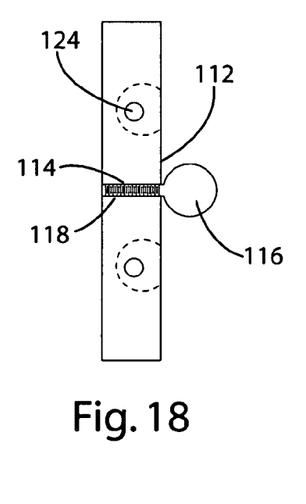
FIG. 18 is an edge view of a compatible male connector employed in connection with the female connector of FIG. 15.
Figure 19:
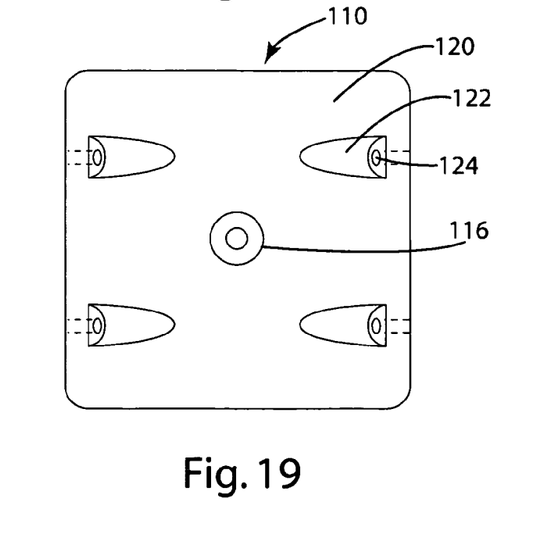
FIG. 19 is a plan view of the male connector of FIG. 18.

The male and female connector elements of this embodiment are similar in operation to the male and female connector elements of the prior embodiment. Female connector element 96 has a keyhole slot 106 formed in front surface 108 of the connector element. Male connector element 110, shown in FIGS. 18 and 19, is similar to female connector element 96, except that it has a screw 112 comprising a threaded shaft 114 and a round head 116 instead of a keyhole slot. The threaded shaft 114 is screwed into a threaded opening 118 in the body 120 of the connector element. Recessed areas 122 and openings 124 are provided for fasteners to attach the male connector element in an opening in the cabinet sidewall, in the same manner as the female connector element is connected.

It should be understood that the foregoing is merely representative of the preferred practice of the present invention and that various changes in the details of construction in the arrangement of the embodiments disclosed herein may be made without departing from the spirit and scope of the present invention.

I claim:

1. In a cabinet assembly wherein a plurality of elevated cabinets are interconnected by a connector mechanism that connects abutting vertical sidewalls of adjacent cabinets, the improvement wherein the connector mechanism comprises:
    interfitting male and female connector elements releasibly mounted in opposed connector openings in the sidewalls of adjacent cabinets,
    the connector openings comprising recesses in the sidewalls, with locking slots extending laterally outwardly from peripheral edges of inner portions of the recesses, the slots being spaced between and separated from front and back surfaces of the sidewalls;
    each connector element including a body having a plurality of angularly spaced tabs extending radially therefrom, the body and the tabs being axially movable into and out of one of the recesses in the sidewall when the connector element is angularly oriented in a released position, the tabs fitting in the locking slots and locking the connector element from axial movement out of the connector opening when the connector element is rotated to a locked position,
    the female connector element having an outer surface with a keyhole opening therein, the keyhole opening having an enlarged opening at one end connected to a narrower width slot at an opposite end,
    the male connector element having a projection extending outwardly from an outer surface of the male connector, the projection comprising an enlarged head on a narrower shaft, the head being smaller than the enlarged opening of the keyhole slot but larger than the slot, the shaft being smaller than the slot, such that the male connector element is locked in the female connector element by inserting the head of the projection through the enlarged opening of the keyhole opening and sliding the shaft of the projection into the narrower slot of the keyhole opening.

2. A cabinet assembly as claim 1 wherein the connector elements include a generally cylindrical body having inner and outer portions, the tabs being positioned at the inner portion of the body, the outer surface being positioned on the outer portion of the body, the connector opening recess in the sidewall of the cabinet having an outer portion as well as the inner portion, the tabs fitting through the outer portion into the inner portion when the connector element is oriented in a released position, the tabs being movable, by rotation of the body, into the locking slots when the tabs ae located in the inner portion of the sidewall.

3. A cabinet assembly according to claim 2 wherein the keyhole slot is oriented horizontally when mounted in the connector opening, with the narrower slot extending horizontally away from the enlarged opening in the keyhole opening,
    the slot orientation being such that adjoining cabinets are connected together by horizontal movement of one cabinet with respect to the other, thereby permitting two cabinets to be positioned in abutting relationship with a ceiling and still being connectable together by interengagement of the projection on one cabinet with the keyhole slot on the other cabinet.

4. A cabinet assembly according to claim 2 wherein the connector elements are recessed in the connector openings in the vertical sidewalls of the adjoining cabinets sufficiently that the cabinets can be locked together with the adjoining sidewalls being in abutment with each other.

5. A cabinet assembly according to claim 2 wherein:
    the body includes four equally spaced locking tabs;
    the outer portion of the opening in the sidewalls has a generally square configuration, with the corners of the square being shaped to receive the tabs therethrough, the square portion having sidewalls having a distance thereacross that is too small to permit the tabs to be inserted through the outer portion with the tabs oriented adjacent the midpoints of the sidewalls; and
    the inner portion of the opening is generally cylindrical and has a diameter sufficient to receive the tabs of the connectors therein,
    the connector element being insertable into the connector opening by orienting the tabs toward the corners of the outer portion and then axially inserting the connector element into the connector opening, the connector element thereafter being locked into the connector opening by rotating the connector element until the tabs are moved to a position wherein the square outer portion prevents axial removal of the tabs from the inner portion of the connector opening.

6. A cabinet assembly according to claim 5 wherein the cylindrical body includes one or more beveled locking surfaces thereon adjacent the tabs but positioned so that they engage the sidewalls of the square portion of the opening and resiliently hold the connector in a desired rotational position when the connector is inserted in the opening and rotated to its locking position.

7. A cabinet assembly as in claim 1 wherein the locking slots are spaced apart, and wherein each locking slot extends for only a portion of the circumference of the connector opening, such that when the connector element is inserted in the connector opening and rotated from its released to its locked position, an end of the slot stops the tab when it is in its locked position.

* * * * *